United States Patent [19]

Bostock et al.

[11] 4,147,510

[45] Apr. 3, 1979

[54] COLORATION PROCESS

[75] Inventors: Stephen B. Bostock; Andrew H. M. Renfrew; Geoffrey H. Cartwright, all of Manchester, England

[73] Assignee: Imperial Chemical Industries Limited, London, England

[21] Appl. No.: 829,503

[22] Filed: Aug. 31, 1977

[30] Foreign Application Priority Data

Sep. 15, 1976 [GB] United Kingdom ............... 38192/76

[51] Int. Cl.² ........................... C09B 1/00; C09B 5/62
[52] U.S. Cl. ......................................... 8/39 C; 8/1 A;
8/21 C; 8/25; 8/26; 8/74; 8/179
[58] Field of Search ............... 8/39 C, 21 C, 26, 41 C,
8/1 A, 74

[56] References Cited

U.S. PATENT DOCUMENTS

| 3,929,842 | 12/1975 | Yamada et al. | 260/376 |
|---|---|---|---|
| 3,993,438 | 11/1976 | Fishwick et al. | 8/21 C |
| 4,030,881 | 6/1977 | Boyd et al. | 8/39 C |

FOREIGN PATENT DOCUMENTS 1380845 1/1975 United Kingdom.

*Primary Examiner*—A. Lionel Clingman
*Attorney, Agent, or Firm*—Cushman, Darby & Cushman

[57] ABSTRACT

Process for the coloration of polyester or cellulose-triacetate textile materials, or polyester/cellulose unions, with disperse anthraquinone dyestuffs containing an alkoxycarbonylalkoxy group and giving a subsequent alkaline rinse.

5 Claims, No Drawings

COLORATION PROCESS

This invention relates to an improved process for the colouration of aromatic polyester or cellulose triacetate textile materials and of unions containing such textile materials.

In the known processes for colouring aromatic polyester textile materials with disperse dyestuffs, an aqueous dispersion of one or more such dyestuffs is applied to the textile material by a dyeing, padding or printing process, the dyestuff being fixed by a simultaneous or subsequent heat treatment. In order that the resulting coloured textile material has the maximum fastness properties it is necessary that any unfixed dyestuff be removed from the surfaces of the fibres present in the textile material, and this is usually achieved by a "reduction clear" treatment (i.e. a treatment in a warm aqueous alkaline solution of sodium hydrosulphite). However the disposal of the liquors from the "reduction clear" treatment causes ecological problems due to the presence of the reducing agent.

It is also well known that aromatic polyester/cellulose unions can be coloured with mixtures of disperse and reactive dyestuffs, but the known processes suffer from the disadvantage that the disperse dyestuffs, in addition to colouring the aromatic polyester part of the union, also stain the cellulose part of the union. In order that the coloured union has the maximum fastness properties it is essential that this staining be removed, but in practice it is found difficult to remove the staining, for example by a "reduction-clear" or "oxidation-clear" treatment, without simultaneously destroying the reactive dyestuff which is attached to the cellulose part of the union. Further in the absence of such a treatment, any dyestuff which is removed by, for example, an ordinary washing treatment, can give rise, particularly in the case of prints, to back staining resulting in staining of other areas of the print, or dull tones. It has now been found that the above difficulties can be overcome by using, as the disperse dyestuff, certain disperse anthraquinone dyestuffs (as hereinafter defined) as any staining of the cellulose caused by such dyestuffs can readily be removed by a simple alkaline treatment (i.e. which does not contain a reducing agent) and which has no adverse effect on the reactive dyestuff used to dye the cellulose. In addition this treatment removes any unfixed disperse dyestuff from the polyester fibres, and there is little or no tendency for any of the disperse dyestuff so removed to back stain the union.

According to the present invention there is provided an improved process for the colouration of aromatic polyester or cellulose-triacetate textile materials which comprises applying to the said textile materials by an aqueous dyeing, padding or printing process a disperse anthraquinone dyestuff, free from carboxylic acid and sulphonic acid groups, which is of the formula:

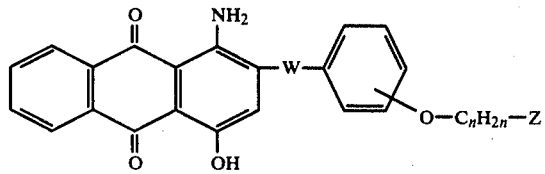

wherein W is an oxygen or a sulphur atom, n is a positive integer of from 1 to 7, and Z is a —CN, —CONHR or —COOR group, wherein R is an optionally substituted hydrocarbon radical, and subsequently giving the coloured textile material a treatment in an aqueous alkaline bath at a pH above 8 and at a temperature between 50° and 85° C.

Throughout this Specification the terms "lower alkyl" and "lower alkoxy" are used to denote alkyl and alkoxy radicals respectively containing from 1 to 4 carbon atoms.

The optionally substituted hydrocarbon radicals represented by R are preferably optionally substituted alkyl, in particular lower alkyl, aryl, in particular monocyclic aryl, or cycloalkyl radicals. As examples of such radicals there may be mentioned lower alkyl radicals such as methyl, ethyl, n-propyl, iospropyl and n-butyl, substituted lower alkyl radicals for example hydroxy lower alkyl such as β-hydroxyethyl and β- or γ-hydroxypropyl, and lower alkoxy lower alkyl such as β-ethoxyethyl and γ-methoxypropyl, monocyclic aryl radicals such as phenyl, and substituted derivatives thereof such as tolyl, xylyl, chlorophenyl, bromophenyl and anisyl. As examples of cycloalkyl there may be mentioned cyclopentyl and cyclohexyl.

It is however preferred that R is a lower alkoxy lower alkyl, hydroxy lower alkyl and, above all, a lower alkyl radical.

Preferably Z is a —COOR group, and above all a group of the formula —COOR$^1$ wherein R$^1$ is lower alkyl.

The process of the invention may be conveniently carried out by immersing the aromatic polyester or cellulose triacetate material in a dyebath comprising an aqueous dispersion of a disperse anthraquinone dyestuff as hereinbefore defined, the dispersion being established, if desired, by non-ionic dispersing agents, cationic dispersing agents and anionic dispersing agents or a mixture of two or more such dispersing agents. Dyeing is then carried out at the temperature usually employed for the aromatic polyester or cellulose triacetate textile material; thus the dyeing process can either be carried out at a temperature between 90° and 100° C., preferably in the presence of a carrier such as diphenyl or o-hydroxydiphenyl, or at a temperature above 100° C. preferably at a temperature between 120° and 140° C. under superatmospheric pressure, when a carrier is not usually necessary.

Alternatively an aqueous dispersion of the disperse anthraquinone dyestuff can be padded onto the said synthetic textile materials, and the dyestuff is fixed on the textile material by steaming it for short periods at temperatures between 100° and 180° C. or by baking it at temperatures between 160° and 220° C. If desired the padding liquor can contain the conventional additives, for example dispersing agents, thickeners, migration inhibitors, or urea.

As a further alternative a thickened printing paste containing the disperse anthraquinone dyestuff in dispersed form can be applied to the surface of the said synthetic textile materials by any of the methods conventionally used for applying printing pastes to such synthetic textile materials, for example by block, screen or roller printing. The printed textile material, optionally after being dried, is then steamed for short periods at temperatures between 100° and 180° C., or is baked at temperatures between 160° and 220° C. Suitable thickening agents which are present in the printing paste include gum tragacanth, gum arabic, alginates, or oil-in-water or water-in-oil emulsions. The printing pastes can also contain conventional additives such as urea and sodium m-nitrobenzene sulphonate.

The coloured aromatic polyester or cellulose triacetate material is then optionally rinsed in water and is then given a treatment in a hot aqueous alkaline solution having a pH of at least 8.0 and preferably having a pH in the range of 10.0 to 13.5, more particularly 10 to 11.5. The temperature of the said alkaline solution is preferably in the range of 60° to 80° C., higher temperatures generally being used at the lower pH's and vice-versa, and the time of treatment will vary on the depth of shade which has been applied to the union and the type of equipment which is being used, however, the times are usually in the range of 30 seconds to 30 minutes. If desired the said alkaline solution can also contain a small amount (for example 0.2 to 1.0%) of a synthetic detergent. After the alkaline treatment the union is rinsed in water, optionally containing a synthetic detergent, and is then dried.

The said alkaline solutions are prepared from alkaline agents such as ammonia or ammonium salts or organic amines such as triethanolamine, but preferred alkaline agents are carbonates and, above all, hydroxides of alkali metals such as lithium, potassium and sodium.

Although the invention is described with reference to the use of a single disperse anthraquinone dyestuff, and hereinbefore defined, in some cases it is preferred to use a mixture of the said disperse anthraquinone dyestuffs. Further in order to obtain a wide variety of shades it is frequently necessary to apply the said disperse anthraquinone dyestuffs in conjunction with other disperse dyestuffs which can be applied by a similar process. Disperse dyestuffs which can be applied in a similar manner are preferably those disperse dyestuffs, in particular of the aminoazobenzene series, which contain at least two carboxylic acid ester groups.

The process of the present invention can also be applied to the colouration of unions containing aromatic polyester or cellulose triacetate fibres and cellulose or polyamide fibres, the disperse anthraquinone dyestuff, as hereinbefore defined, being applied in conjunction with a suitable dyestuff for the cellulose or polyamide fibres, for example a Direct Dyestuff, an Acid Dyestuff, a Reactive Dyestuff, a Sulphur Dyestuff or a Vat Dyestuff, the coloured union being given a treatment in an aqueous alkaline bath at a pH above 8 and at a temperature between 50° and 85° C. Preferably the union is an aromatic polyester/cellulose union and the dyestuff, or dyestuffs, for the cellulose fibres present is a Reactive Dyestuff.

According to a further feature of the present invention there is provided an improved process for the colouration of aromatic polyester/cellulose unions which comprises applying to the said unions a reactive dyestuff and a disperse anthraquinone dyestuff as hereinbefore defined, fixing the dyestuffs on the union, and thereafter subjecting the coloured union to a treatment in an aqueous alkaline bath at a pH above 8.0 and at a temperature between 50° and 85° C.

The said disperse anthraquinone dyestuff and the reactive dyestuff can be applied in separate steps in either order but are preferably applied together.

Whilst this process is applicable to the batchwise dyeing of the said unions, it is preferably carried out in a continuous manner.

Thus this process of the invention can be conveniently carried out by continuously padding or printing the union with a padding liquor or print paste containing the said disperse anthraquinone dyestuff, the reactive dyestuff and an alkaline agent. The padded or printed union is then preferably dried and is then subjected to a heat treatment to fix the dyestuffs on the union. This heat treatment can for example comprise treatment with superheated steam or in steam either at atmospheric pressure or under pressure, or a baking treatment in hot air at temperatures in the region of 150° to 230° C., or by passing the union over a heated surface for example over a calendar at 150° to 230° C. At the conclusion of the heat treatment the union is optionally rinsed in water and is then given a treatment in the aqueous alkaline bath as hereinbefore defined.

In addition to the dyestuffs, the padding liquors or print pastes can contain any of the adjuvants which are conventionally employed in such liquors or pastes, for example thickening agents, migration inhibitors, cationic, anionic or non-ionic dispersing agents, urea, humectants, solubilising agents, bacteriodides, sequestering agents, wetting agents, emulsifiers, oxidising agents such as sodium chlorate or sodium m-nitrobenzene sulphonate, fixation accelerators such as diphenyl and derivatives thereof or polyethylene oxide adducts known as carriers or fixation accelerators, or antifoam agents such as organic derivatives of silicon. The said padding liquors or print pastes can be slightly acidic or neutral but are preferably slightly alkaline which can be achieved by incorporating therein a small amount, up to 20% by weight, of an alkaline agent such as sodium bicarbonate or sodium carbonate. Alternatively the print pastes or padding liquors can contain a substance, such as sodium trichloroacetate, which on heating or steaming liberates an alkaline agent.

When the said padding liquors or print pastes are slightly acidic or neutral then it is usually necessary to subsequently treat the padded or printed union with an alkali in order to obtain satisfactory fixation of the reactive dyestuff. This treatment with an alkali can be carried out before, but is preferably carried out after the fixation of the disperse dyestuff. However in the case of certain classes of reactive dyestuffs, for example those containing a 4-chloro-6-hydroxy-1:3:5-triazin-2-ylamino group, fixation of such dyestuffs following application from neutral or acidic medium can be effected by a heat treatment without the use of alkali.

When the dyestuffs are separately applied then this process of the invention can for example be conveniently carried out by padding or printing the said union with a padding liquor or print paste containing the disperse anthraquinone dyestuff, drying, heating or steaming the union to effect fixation of the disperse anthraquinone dyestuff, padding or printing the union with a padding liquor or print paste containing a reactive dyestuff and an alkali, fixing the reactive dyestuff by heating or steaming or, in the case of highly reactive dyestuffs, batching the union in a moist state. The union is then, optionally after rinsing in water, given a treatment in a hot aqueous solution of an alkaline agent at a pH above 8.0. If desired in this method of carrying out the process of the invention the dyestuffs can be applied in the reverse order.

When the reactive dyestuff is fixed by an alkaline shock treatment involving the use of a high concentration of an alkali as the last stage in applying both dyestuffs to the union, then when the union is subsequently given a rinse in water to remove the excess alkali the resulting alkaline solution can itself act as the aqueous alkaline bath, as hereinbefore defined, so that a separate treatment in such a bath may not be necessary.

The aromatic polyester/cellulose unions used in the process of the invention can be any textile materials which are mixtures of aromatic polyester fibres and cellulose fibres. Such unions are usually in the form of knitted, or preferably woven goods. The percentage of aromatic polyester fibres is usually in the range of 20 to 90%, and preferably 30 to 85%, by weight of the weight of the union. The aromatic polyester fibres are preferably polyethylene terephthalate fibres, and the cellulose fibres are preferably cotton, linen, viscose rayon or polynosic rayon fibres.

Although the invention is described with reference to the padding liquor or print paste containing a disperse anthraquinone dyestuff and a reactive dyestuff, in many cases, in order to obtain the required shades, it is necessary to use a mixture of the said disperse anthraquinone or a mixture of the disperse anthraquionone dyestuff with another disperse dyestuff having similar dyeing properties such as a disperse monoazo dyestuff containing two carboxylic acid ester groups, and/or a mixture of the reactive dyestuffs, and the use of such mixtures is within the scope of the invention. Preferably the disperse anthraquinone dyestuff, or mixture thereof, and the reactive dyestuff, or mixture thereof, are so chosen that the polyester fibres and the cellulose fibres present in the union are coloured to substantially the same shade.

The disperse anthraquinone dyestuffs, as hereinbefore defined, and their manufacture are described in British Pat. No. 1437444.

A preferred class of the said disperse anthraquinone dyestuffs for use in the process comprises the dyestuffs of the formula:

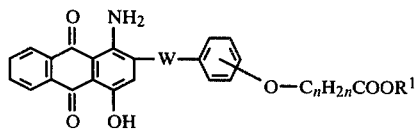

wherein W, n and $R^1$ have the meanings stated. It is further preferred that W represents an oxygen atom, and also that n represents 1 or 2.

The reactive dyestuffs used in this process of the invention can be any water-soluble dyestuffs which contain at least one fibre-reactive group this being defined as a group whose presence in the dyestuff molecule renders the dyestuff capable of chemically combining with hydroxy groups present in cellulose textile materials so that the dyestuff molecule becomes attached to the cellulose molecule through a covalent chemical bond or bonds. Each fibre-reactive group is attached to a carbon atom present in the dyestuff molecule and preferably to a carbon atom of an aromatic ring, preferably a benzene ring, present in the dyestuff molecule. The said dyestuffs are preferably dyestuffs of the azo, including monoazo and polyazo and metallised azo dyes, anthraquinone, formazan, triphendioxazine, nitro and phthalocyanine series containing at least one fibre-reactive group.

As examples of fibre-reactive groups there may be mentioned acylamino radicals derived from olefinically unsaturated aliphatic carboxylic acids such as acryloylamino and crotonylamino, or from halogen-substituted aliphatic carboxylic acids such as β-chloropropionylamino, β-bromopropionylamino, β:γ:γ-trichlorocrotonylamino and tetrafluorocyclobutylacryloylamino. Alternatively the fibre-reactive group can be a vinyl sulphone, β-chloroethylsulphonyl, β-sulphatoethylsulphonyl, β-chloroethylsulphonamide or an optionally N-substituted β-aminoethylsulphonyl group.

The fibre-reactive group is preferably a heterocyclic radical having two or three nitrogen atoms in the heterocyclic ring and at least one labile substituent attached to a carbon atom of the heterocyclic ring. As examples of labile substituents there may be mentioned chlorine, bromine, fluorine, quaternary ammonium groups, thiocyano, sulphonic acid, hydrocarbylsulphonyl groups, groups of the formula

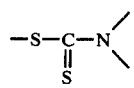

wherein the nitrogen atom carries optionally substituted hydrocarbon or heterocyclic radicals, and groups of the formula:

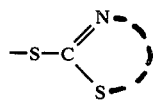

wherein the dotted line indicates the atoms necessary to form an optionally substituted or fused heterocyclic ring.

As specific examples of such fibre-reactive heterocyclic radicals there may be mentioned 3:6-dichloropyridazine-4-carbonylamino, 2:3-dichloroquinoxaline -5- or 6- (sulphonyl or carbonyl) amino, 2:4-dichloroquinazoline-6- or 7-sulphonylamino, 2:4:6-trichloroquinazoline-7 - or 8- sulphonylamino, 2:4:7- or 2:4:8-trichloroquinazoline-6-sulphonylamino, 2:4-dichloroquinazoline-6-carbonylamino, 1:4-dichlorophthalazine-6-carbonylamino, 4:5-dichloropyridazon-1-ylamino, 2:4-dichloropyrimid-5-ylcarbonylamino, 1-(phenyl-4'-carbonylamino)-4:5-dichloropyridazone, 1-(phenyl-4'-sulphonylamino)-4:5-dichloropyridazone, 2:4- and/or 2:6-dichloro- or bromo- pyrid-6- (and/or -4)ylamino, difluoro-chloropyrimidylamino, trichloropyrimidylamino, tribromopyrimidylamino, dichloro-5-(cyano, nitro, methyl or carbomethoxy)pyrimidylamino, 2-methylsulphonyl-6-chloropyrimid-4-ylcarbonylamino and 5-chloro-6-methyl-2-methylsulphonylpyrimid-4-ylamino, and more particularly 1:3:5-triazin-2-ylamino radicals which contain a fluorine or a bromine and, above all, a chlorine atom on at least one of the 4- and 6- positions, for example 4:6-dichloro-1:3:5-triazin-2-ylamino. When the triazine nucleus contains only a single halogen atom, preferably a chlorine atom, then the third carbon atom of the triazine ring can be substituted by a hydrocarbon radical, such as methyl or phenyl, but more particularly by an optionally substituted hydroxy, mercapto or amino group, such as methoxy, phenoxy, α- and β-naphthoxy, methylmercapto, phenylthio, methylamino, diethylamino, cyclohexylamino and anilino and N-alkylanilino and substituted derivatives thereof such as anisidino, toluidino, carboxylanilino, sulphoanilino, disulphoanilino and sulphonated naphthylamino.

Thus, a preferred class of the reactive dyestuffs comprises those dyestuffs which contain as the fibre-reactive group a group of the formula:

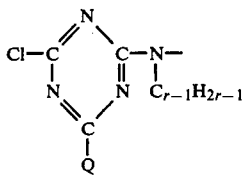

wherein r is 1 or 2, and Q is a chlorine atom, an optionally substituted amino group or an etherified hydroxyl group.

The optionally substituted amino groups represented by Q are preferably optionally substituted alkylamino, anilino, or N-alkylanilino groups, e.g. methylamino, ethylamino, β-hydroxyethylamino, di-(β-hydroxyethyl)amino, β-methoxyethylamino, β-sulphatoethylamino, anilino, o-, m- and p-sulphoanilino, 4- and 5-sulpho-2-carboxyanilino, 4- and 5-sulpho-2-methoxyanilino, 4- and 5-sulpho-2-methylanilino, 4-and 5-sulpho-2-chloroanilino, 4- and 5-sulpho-2-chloroanilino, 2,4- 2,5- and 3,5-disulphoanilino, N-methyl-m- and p-sulphoanilino.

If desired the fibre-reactive group can be of the type:

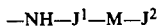

wherein J$^1$ is a pyrimidine or triazine ring optionally carrying a labile substituent, J$^2$ is a pyrimidine or triazine ring carrying at least one labile substituent and M is a bridging member which is linked to J$^1$ and J$^2$ through optionally substituted imino groups, said imino groups being linked together through an alkylene or arylene radical such as ethylene, 1:4-phenylene or 2-sulpho-1:4-phenylene.

Other linking groups of particular interest represented by M are the divalent radicals of stilbene, diphenyl, diphenyloxide, diphenylamine, diphenylurea, diphenoxyethane and diphenylamino-s-triazine, which contain a sulphonic acid group in each benzene nucleus.

It is preferred that J$^1$ and J$^2$ should each represent a chloro-s-triazine group. Thus, a further class of reactive dyestuffs comprises those dyestuffs which contain as the fibre-reactive group a group of the formula:

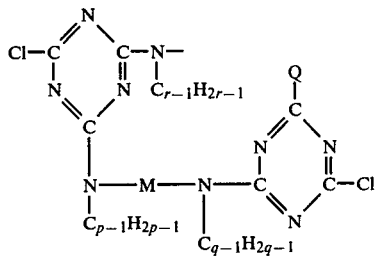

(7)

wherein r, p and q are each independently 1 or 2, and M and Q have the meanings stated above.

The group Q, as previously defined, includes within its scope groups which contain a chromophoric system linked to the carbon atom of the triazine ring through —NH— or —O—.

Such reactive dyestuffs can be obtained in conventional manner, for example by reacting a water-soluble dyestuff containing a primary or secondary amino group with a compound which contains the said fibre-reactive group. As examples of such compounds there may be mentioned acryloyl chloride, cyanuric chloride, 2:4:6-trichloropyrimidine, 2:4:6-trichloro-5-(cyano- or chloro-) pyrimidine and 6-methoxy-2:4-dichloro-1:3:5-triazine.

The reactive dyestuff may also be one in which the fibre-reactive group is the residue of a phosphorus acid, especially a phosphonic acid, which dyestuffs react with cellulosic materials when heated in the presence of a carbodiimide, as described in U.K. Pat. No. 1,411,306.

The other classes of dyestuffs which are present when the process of the present invention is applied to unions (e.g., Vat Dyestuffs, Acid Dyestuffs) are described in, for example, the Third Edition of the Colour Index which was published in 1971.

By the process of the present invention aromatic polyester or cellulose triacetate textile materials can be coloured in red shades possessing excellent fastness to light, to wet treatments and to dry heat treatments, whilst aromatic polyester/cellulose unions are coloured in a wide variety of shades which have excellent fastness to the tests commonly applied to such unions and there is excellent reserve of the white unprinted portions of such unions.

The invention is illustrated but not limited by the following Examples in which the parts and percentages are by weight.

EXAMPLE 1

70 Parts of a 15% aqueous dispersion of 1-amino-2-[p-(ethoxycarbonylmethoxy)phenoxy]-4-hydroxyanthraquinone and which dispersion contains 7 parts of the disodium salt of bis(2-sulphonaphth-1-yl)methane is added to a mixture comprising:

| | |
|---|---|
| 10% aqueous solution of sodium alginate | 500 parts |
| Aqueous emulsion of sulphonated sperm oil and pine oil | 20 parts |
| Urea | 50 parts |
| Sodium bicarbonate | 10 parts |
| Penta sodium salt of 1-[4'-chloro-6'-(2''-carboxy-4''-sulphoanilino)-1'-3':5'-triazin-2'-ylamino]-7-(o-sulphophenylazo)-8-naphthol-3:6- disulphonic acid | |
| Water to a total of | 1000 parts | and the resulting print paste is printed onto a woven 67:33 "Terylene"/ cotton textile material ("Terylene" is a Registered Trade Mark), and the textile material dried. The textile material is then steamed for 6 minutes at 180° C. at atmospheric pressure. The textile material is then rinsed in water, treated for 10 minutes at 85° C. in an aqueous solution containing 0.2% of sodium hydroxide and 0.2% of non-ionic detergent at a liquor ratio of 50:1, rinsed again in water and finally dried.

The textile material is thereby printed in a bright bluish-red having excellent reserve on the white unprinted portions, and the print has excellent fastness to wet treatments.

Instead of steaming the printed textile material for 6 minutes at 180° C., the printed textile material is baked for 1 minute at 200° C. or subjected for 20 minutes to steam at a pressure of 1.4 Kg/cm$^2$ when similar results are obtained.

EXAMPLE 2

70 Parts of a 15% aqueous dispersion of 1-amino-2-[p-(ethoxycarbonylmethoxy)phenoxy] 4-hydroxyanthraquinone and which contains 10% by weight (i.e., 7 parts) of the disodium salt of bis(2-sulphonaphth-1-yl)methane is added to a mixture comprising 500 parts of a 10% aqueous solution of sodium alginate and 20 parts of an aqueous emulsion of sulphonated sperm oil and pin oil, and water is then added to give a total of 1000 parts.

The resulting print paste is printed onto a woven aromatic polyester textile material and the textile material is dried. The textile material is steamed for 6 minutes at 170° C. at atmospheric pressure, rinsed in water, treated for 10 minutes at 85° C. in an 0.2% aqueous solution of sodium hydroxide, rinsed again in water, and finally dried.

A bright bluish-red print of excellent wet and dry heat fastness properties is obtained.

EXAMPLE 3

In place of the woven aromatic polyester textile material used in Example 2 there is used a woven cellulose triacetate textile material, and fixation of the dyestuff on this textile material is achieved by steaming for 20 minutes with steam at a pressure of 1.4 Kg/cm².

A bright bluish-red print is thereby obtained.

EXAMPLE 4

In place of the woven 67:33 "Terylene"/cotton textile material used in Example 1 there is used a woven 50:50 "Terylene"/cotton textile material or a woven 67:33 "Terylene"/polynosic viscose rayon textile material when similar results are obtained.

EXAMPLE 5

If the disperse anthraquinone dyestuff used in Examples 1 to 4 is replaced by an equivalent amount of any one of the following dyestuffs, or a mixture of two or more thereof, then similar results are obtained:

1-amino-2-[m-(methoxycarbonylmethoxy)phenoxy]-4-hydroxyanthraquinone,
1-amino-2-[p-(methoxycarbonylmethoxy)phenoxy]-4-hydroxyanthraquinone,
1-amino-2-[p-(ethoxycarbonylpropoxy)phenoxy]-4-hydroxyanthraquinone,
1-amino-2-[p-(ethoxyethoxycarbonylmethoxy)phenoxy]-4-hydroxyanthraquinone,
1-amino-2-[p-(cyanomethoxy)phenoxy]-4-hydroxyanthraquinone,
1-amino-2-[p-(dimethylamidomethoxy)phenoxy]-4-hydroxyanthraquinone,
1-amino-2-[p-(allyloxycarbonylmethoxy)phenoxy]-4-hydroxyanthraquinone.

We claim:

1. A process for the colouration of aromatic polyester or cellulose-triacetate textile materials which comprises applying to the said textile materials by an aqueous dyeing, padding or printing process a disperse anthraquinone dyestuff, free from carboxylic acid and sulphonic acid groups, which is of the formula:

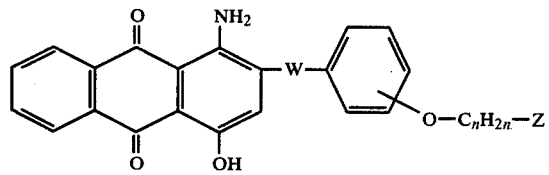

wherein W is an oxygen or a sulphur atom, n is a positive integer of from 1 to 7, and Z is a —CN, —CONHR or —COOR group, wherein R is an optionally substituted hydrocarbon radical, and subsequently giving the coloured textile material a treatment in an aqueous alkaline bath at a pH above 8 and at a temperature between 50° and 85° C.

2. A process as claimed in claim 1 wherein Z is a —COOR$^1$ group in which R$^1$ is a lower alkyl radical.

3. A process as claimed in claim 2 wherein W represents an oxygen atom and n is 1 or 2.

4. A process as claimed in claim 1 wherein the disperse anthraquinone dyestuff is applied in conjunction with disperse dyestuffs of the aminoazobenzene series which contain at least two carboxylic acid ester groups.

5. A process for the colouration of aromatic polyester/cellulose unions which comprises applying to the said unions a reactive dyestuff and a disperse anthraquinone dyestuff as defined in claim 1, fixing the dyestuffs on the union and thereafter subjecting the coloured union to a treatment in an aqueous alkaline bath at a pH above 8.0 and at a temperature between 50° and 85° C.

* * * * *